(12) United States Patent
Ritter et al.

(10) Patent No.: US 6,523,544 B1
(45) Date of Patent: Feb. 25, 2003

(54) FAN-ASSISTED ASHTRAY

(75) Inventors: Mitchell Ritter, Colombier (CH); Jacques Berset, Fribourg (CH); Thomas Riedel, London (GB); Oliver Giles Ferguson, Cambridge (GB)

(73) Assignee: Philip Morris Incorporated, New York, NY (US)

( * ) Notice: Subject to any disclaimer, the term of this patent is extended or adjusted under 35 U.S.C. 154(b) by 0 days.

(21) Appl. No.: 09/763,734

(22) PCT Filed: Sep. 13, 1999

(86) PCT No.: PCT/GB99/03020
§ 371 (c)(1),
(2), (4) Date: Apr. 11, 2001

(87) PCT Pub. No.: WO00/15059
PCT Pub. Date: Mar. 23, 2000

(30) Foreign Application Priority Data

Sep. 11, 1998 (EP) .............................. 98307371

(51) Int. Cl.⁷ ...................... B01D 59/50; A24F 19/12
(52) U.S. Cl. ................. 131/242; 131/241; 131/240.1; 131/231; 131/238; 55/385.8
(58) Field of Search .................. 55/385.8; 131/231, 131/238, 240.1, 242, 241

(56) References Cited

U.S. PATENT DOCUMENTS

| 2,788,085 | A | * | 4/1957 | Waller | .................... 55/357 |
| 3,958,965 | A | * | 5/1976 | Raczkowski | ............... 55/385.8 |
| 4,148,618 | A | | 4/1979 | Christenson | |
| 4,161,181 | A | | 7/1979 | Nicks | |
| 4,671,300 | A | | 6/1987 | Grube | |
| 5,259,400 | A | * | 11/1993 | Bruno et al. | ................. 131/238 |

FOREIGN PATENT DOCUMENTS

| DE | 29515742 U | 1/1996 |
| FR | 2689399 A | 10/1993 |
| GB | 2219925 | 12/1989 |
| GB | 2251542 A | 7/1992 |
| GB | 2298351 | 9/1996 |
| JP | 59-148626 A | 8/1984 |
| JP | 59-182705 | 10/1984 |
| JP | 02-255070 | 10/1990 |
| JP | 7-51044 | 2/1995 |
| JP | 7-155162 | 6/1995 |
| JP | 8-322544 | 12/1996 |
| JP | 10-23884 | 1/1998 |
| WO | WO8602529 | 5/1986 |

* cited by examiner

Primary Examiner—Steven P. Griffin
Assistant Examiner—Dionne A. Walls
(74) Attorney, Agent, or Firm—Burns, Doane, Swecker & Mathis, LLP

(57) ABSTRACT

A fan-assisted ashtray includes a hollow body having a lid for closing an open top thereof; a tray member for containing ash from a smoker's article; a filter member located below the tray member; and an electric fan located below the filter member for drawing air and smoke into the filter member and for exhausting air to the exterior of the body through a vent. The filter member extends across an entire horizontal sectional area of the body.

23 Claims, 4 Drawing Sheets

FAN-ASSISTED ASHTRAY

This application is a national stage filing under 35 U.S.C. 371 of PCT/GB99/03020 filed Sep. 13, 1999 which International Application was published by the International Bureau in English on Mar. 23, 2000.

The present invention relates to a fan-assisted ashtray, i.e. an ashtray in which a fan is used to assist in the containment of smoke in the ashtray.

Some bystanders find tobacco smoke and the smell of tobacco objectionable. In certain locations there may be a desire to minimize them to comply with local ordinances or regulations relating to air quality. Ashtrays with closeable lids are a partial solution to this problem. Providing ashtrays with negative pressure, e.g. through the use of a fan and associated filter, are something of an improvement because they can confine smoke in an improved manner. However, these products tend to have inefficient filters, are bulky, noisy and unsightly and inelegant in is appearance.

The invention is defined in the attached independent claim, to which reference should now be made. Further preferred, advantageous features are to be found in the dependent claims.

In a preferred form a fan-assisted ashtray according to the invention comprises a substantially hollow body having a closable lid mounted thereon, a support member which extends across an upper end of the body, for supporting a smoker's article in use, and defining an aperture therein, a tray member located below the aperture for containing ash from a smoker's article, a filter member located below the tray member and extending across substantially an entire horizontal sectional area of the body, an electrically powered fan located below the filter member for drawing air and smoke from the smoker's article through the aperture, around the tray and through the filter member, and for exhausting air to the exterior of the body through a vent, the ashtray body being generally ellipsoidal and having an elliptical lid which is mounted on a hinge member, the hinge member being slidably mounted on a track at an upper edge region of the body for both pivotal and sliding movement of the lid with respect to the body between open and closed positions.

Figure 1:
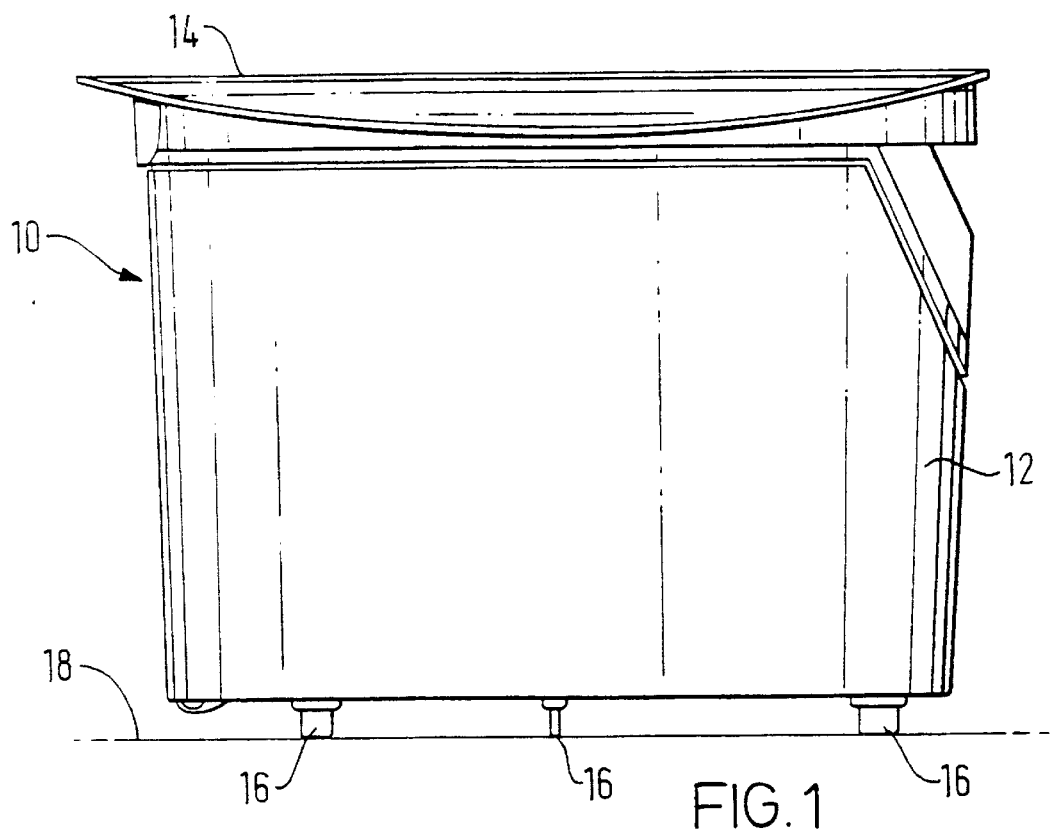
Figure 2:
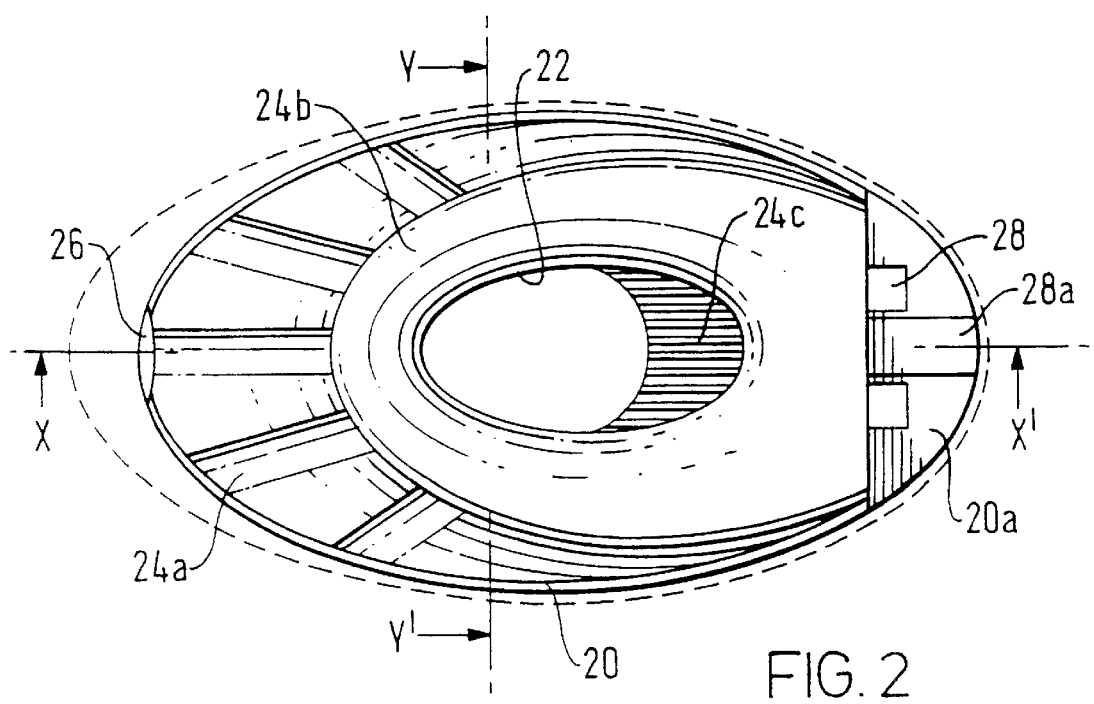
Figure 4:
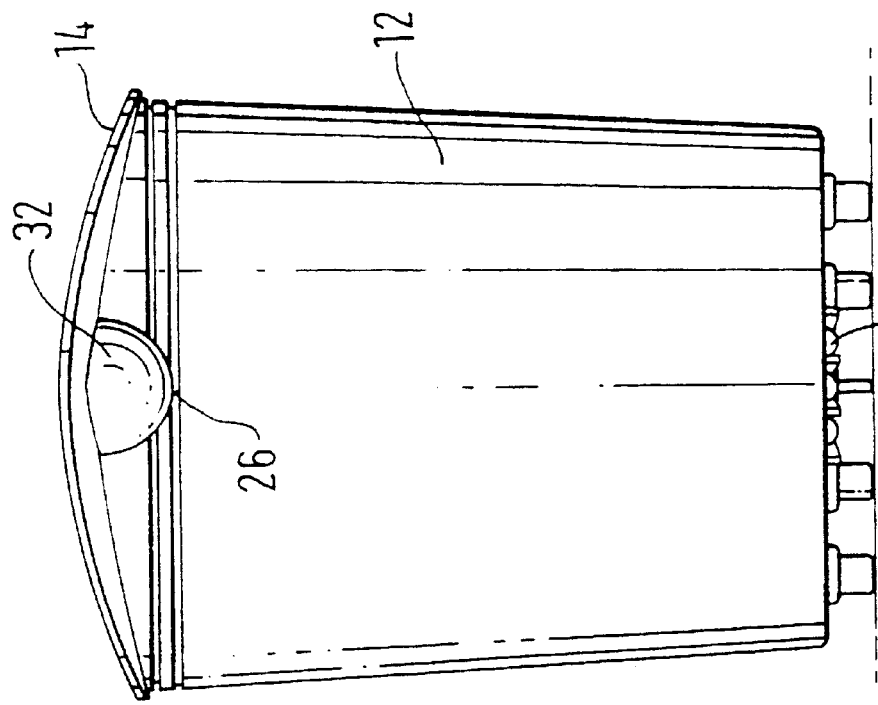
Figure 3:
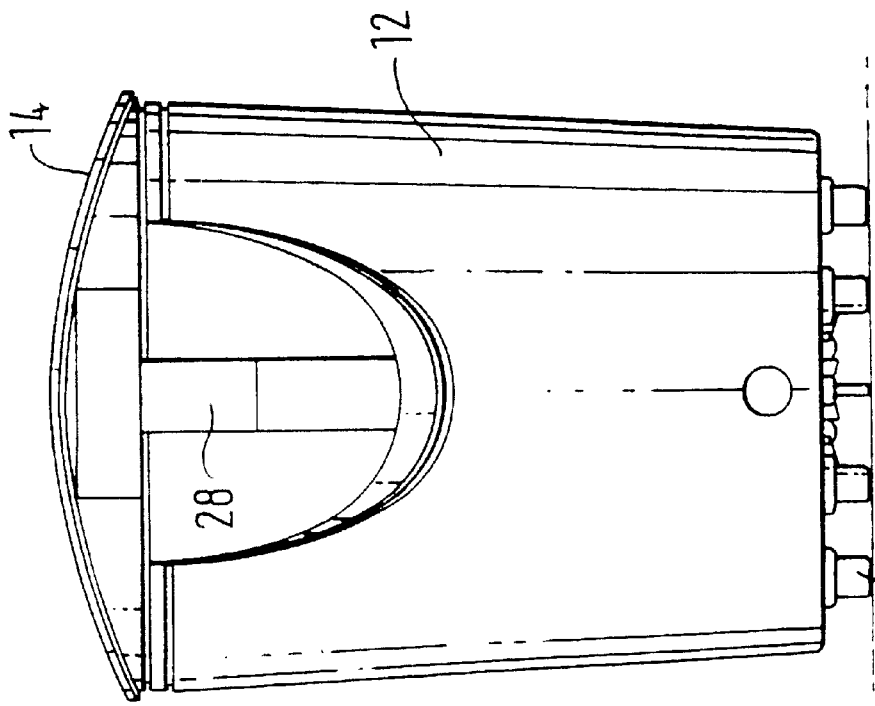
Figure 6:
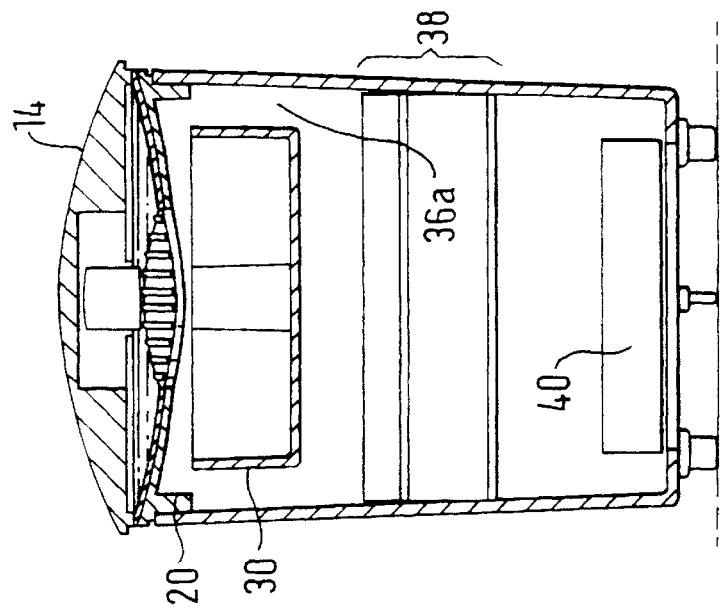
Figure 5:
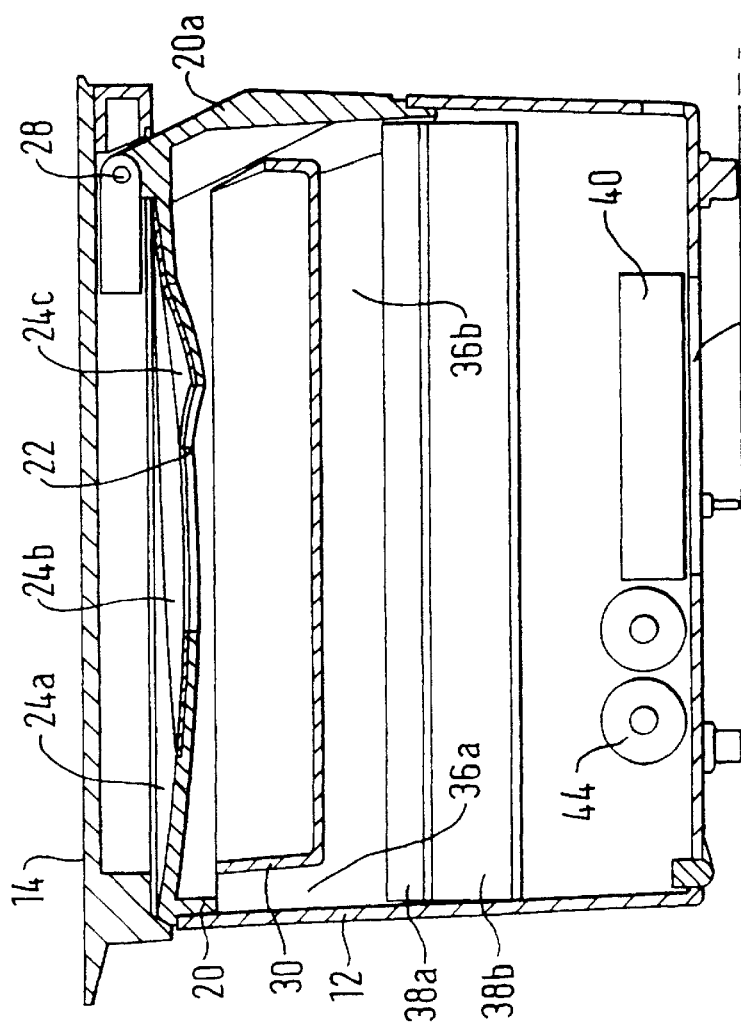
Figure 7:
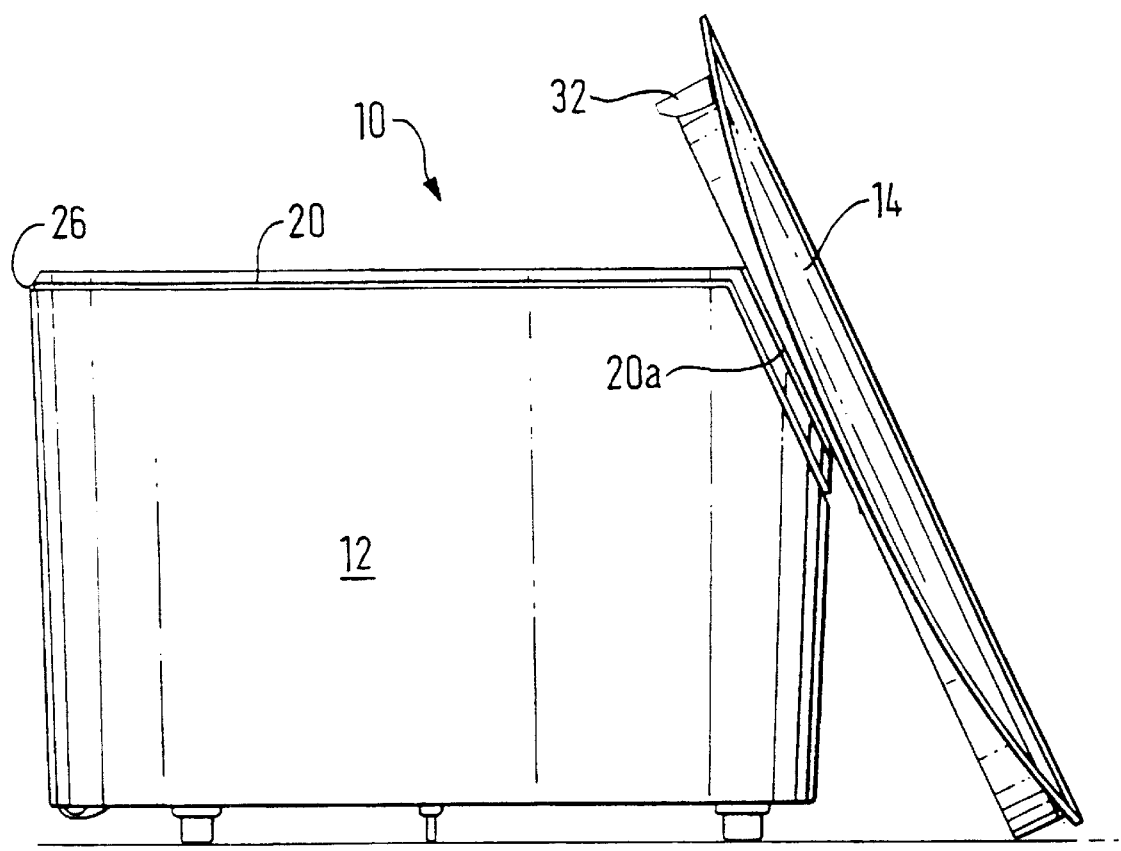
Figure 8:
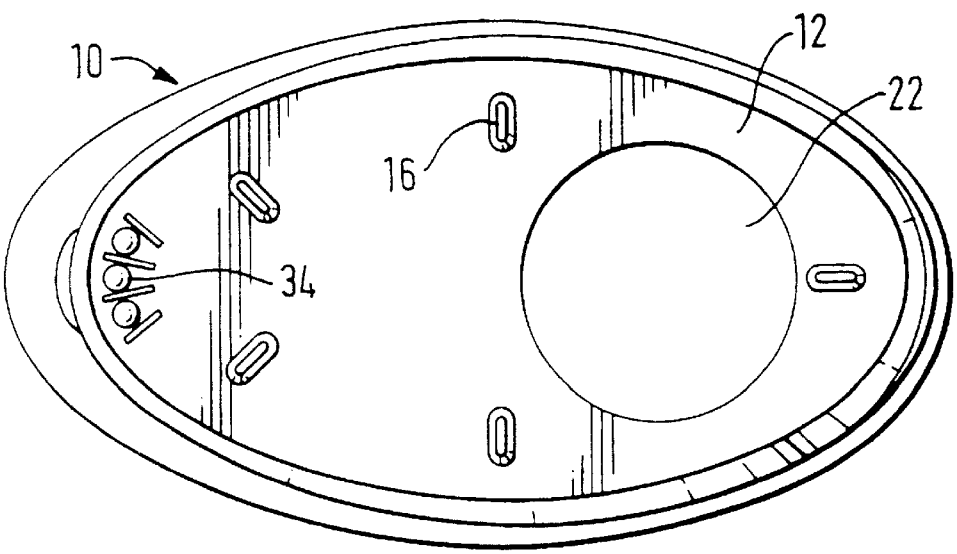

The invention may be carried into practice in various ways, but an embodiment will now be described, by way of example only, with reference to the accompanying drawings in which:

FIG. 1 shows, in side view, an ashtray according to an embodiment of the present invention, FIG. 2 shows the ashtray of FIG. 1 in top plan view, with lid removed, FIG. 3 shows the ashtray of FIG. 1 from one end thereof, FIG. 4 shows the ashtray of FIG. 1 from an opposite end thereof, FIG. 5 shows the ashtray of FIG. 1 in schematic sectional view taken along line X–X' of FIG. 2, FIG. 6 shows the ashtray of FIG. 1 in schematic sectional view taken along line Y–Y' of FIG. 2, FIG. 7 is a side view of the ashtray of FIG. 1 with the lid in an open position, and FIG. 8 shows the ashtray of FIG. 1 in bottom plan view.

Referring to FIG. 1, there is shown in side view, generally at 10, an electrically operated fan-assisted ashtray comprising a body or bowl 12 of injection moulded ABS plastics and an openable hingedly mounted lid 14 of metal, The body 12 has rubber feet 16 which are shown resting on a mounting surface 18 which might, for example, be a domestic table. For ease of assembly the rubber feet may have adhesive surfaces so that they may be stuck on to the underside of the body 12. FIG. 2 is a top plan view of the ashtray 10, with the lid 14 removed for illustration. The position occupied by the lid when closed is shown in broken lines. From FIG. 2 it can be seen that the ashtray 10 is generally ellipsoidal in shape, having a top support member 20 defining a substantially oval central aperture 22. The top member 20 comprises a corrugated front support portion 24a for supporting a cigarette or other smoker's article (not shown), a smooth shoulder 24b surrounding the aperture 22 and a corrugated stubbing portion 24c for stubbing out a cigarette. At a front edge there is located a recess 26 for receiving a closure latch on the lid (not shown) and at a rear edge a hinge 28 for mounting the lid. The hinge itself is slidably mounted in a track 28a on an oblique surface 20a which is formed integrally with and is a continuation of the top member 20 and which interrupts the otherwise ellipsoidal shape of the body 12 at its upper rear edge.

The top member 20 may comprise portions 24a, 24b, 24c and surface 20a formed integrally from a single piece of metal. In a preferred embodiment the top member is cast zinc. The shoulder 24b may be a ceramic insert; alternatively the entire top member 20 or portions of it may be coated in chrome or, for example in vitreous enamel. Through the aperture 22 can be seen part of a tray 30 below, for receiving ash from a cigarette or similar. The tray is described in more detail below.

FIG. 3 shows the ashtray 10 from the rear, from which it may be seen that the body 12 tapers so that it is slightly wider at the top than at the bottom. The lid 14 is shown in closed position mounted on the hinge 28.

FIG. 4 shows the ashtray 10 from the front. Again, the lid 14 is shown in closed position and at the front of the lid the closure latch 32 may be seen, located in the recess 26 at the front of the body. Beneath the body is mounted a cluster 34 of light emitting diodes (LEDs) which are used as status indicators or function indicators and which are described in more detail below.

Turning to FIGS. 5 and 6, these are respectively cross sectional views taken along lines X–X' and Y–Y' of FIG. 2. Inside the body 12 and beneath the lid 14, the top member 20 comprising the portions 24a, 24b and 24c can be seen, which define aperture 22. Beneath aperture 22 is located the metal ash-capturing tray 30 which is generally ellipsoidal in shape. The tray 30 is supported by the top member 20 by means of a releasable bayonet type engagement (not shown). Around the periphery of the tray 30, between the tray 30 and the wall of the body 12 is an annular space 36a which opens into a further space 36b beneath the tray 30. Beneath space 36b is mounted a filter cartridge 38 comprising upper and lower filter elements 38a and 38b in a rigid body (not shown) which is mounted as a tight friction fit in the body 12.

The upper filter element 38a is a pad of polyester, lofted non-woven material containing electrostatically charged polymer fibres. Beneath the upper element 38a, the lower element 38b is a discrete bed of activated granular carbon, such as charcoal. A third element (not shown) may optionally be combined with the second element as a discrete bed of activated alumina granules which have been soaked in potassium permanganate ($KMNO_4$). The separate filter elements are held together in a rigid body (not shown) of porous fabric, which preserves the ellipsoidal shape of the filter cartridge and maintains the close friction fit with the wall of the ashtray body 12.

In use, the electrostatic cloth filter element 38a removes particulate matter such as ash particles, whereas the carbon filter 38b removes or filters gases which might have an undesirable odour. This arrangement makes for efficient odour and smoke removal.

Beneath the filter cartridge 38, and shown only schematically, is located an electric centrifugal fan 40 having plastic blades. The centrifugal fan is chosen for its high pressure drop, low velocity performance. The high pressure drop is important for efficiency and the low velocity is important to increase the contact time of the smoke in the filter elements. This design makes for efficient filtration of the entrained air and also for a minimisation of turbulence, which results in a quieter operation of the fan. The fan 40 vents through an aperture 42 in the bottom of the body 12 and is powered by rechargeable battery cells 44 though, as explained below, it may optionally take its power from mains electricity. A door (not shown) in the base of the body or bowl 12 allows access to the batteries or their removal or replacement. Increased efficiency of the fan also permits the fan to last longer without re-charging its batteries.

The fan 40 and its drive circuitry may be mounted in a sub-chassis (preferably injection-moulded ABS plastics). This allows for sub-assembly of the ashtray's working components before final assembly into the base of the body or bowl 12.

FIG. 7 shows the ashtray 10 with its lid 14 in open position. To move the lid from the closed position (as depicted in FIG. 1) to the open position two different actions are required. The first action is the pivoting of the lid 14 on its hinge 28. The second action is the sliding of the hinge 28 (and with it the lid 14) on its track 28a on the oblique surface 20a of the top member 20. This leaves the lid in the position shown in FIG. 7 allowing access to the top member 20 and aperture 22. The hinge allows the lid to slide away from top member and allow access to its entire top surface.

FIG. 8 shows the ashtray 10 in bottom plan view. The feet 16 can be seen distributed around the periphery of the elliptical floor of the body 12, and the vent aperture 42 can be seen towards the rear of the ashtray. Towards the front of the ashtray the LED cluster 34 is positioned with the individual LEDs pointing away from the body 12.

In use, a smoker activates the ashtray 10 by opening the lid 14. Firstly the lid is pivoted about hinge 28 and then the hinge and lid are slid over track 28a leaving the top member 20 and aperture 22 exposed. The fan 40 is activated automatically on opening of the lid as a result of switching of a magnetic proximity switch (not shown) by separation of the latch 32 on the lid and recess 26 on the top member 20.

Once activated, the fan, driven by batteries 40 or else by mains electricity through a cable (not shown) draws air down through the aperture 22 from a so-called "capture zone" which is of the order of a centimeter or so above the aperture. Together with air, any smoke from a cigarette or other smoker's article resting on the support portion 24a of the top member is drawn into the aperture 22. The air and smoke are then drawn over the edge of the tray 30 into the peripheral space 36a, through the space 36b, being a minimum plenum space between the bottom of the tray and the top of the filter for even distribution of the smoke over the filter surface, then into the filter cartridge 38.

In the cartridge 38 the first filter element 38a comprising electrostatically charged polymer fibres removes smoke particles from the air by virtue of the smoke particles being negatively charged and being attracted electrostatically to the positively charged fibres, to which they adhere.

The activated charcoal element 38b physically filters odorous gas molecules from the air in the conventional manner. The optional alumina granule element performs a chemical reaction with certain remaining odorous gas molecules.

Other natural or synthetic filter materials may be used, a non-exhaustive list of which might include soils, peat, compost, sawdust, zeolites, clays, silica gels, adsorbing resins and ion-exchange resins.

The fan then expels the filtered air through the vent aperture 42.

To de-activate the fan, the smoker closes the lid, deactivating the magnetic proximity switch (not shown). Any smoke or odours trapped between the top member 20 and filter 38, for example from ash located in the tray 30, remain in the body by virtue of the lid making a sealing closure of the ashtray.

The lid 14, top member 20 and tray 30 may be removed together for their cleaning and for the disposal of any butts or ash without touching the dirty tray. Their release is preferably effected by release of a bayonet clip (not shown) by which they are retained in the body 12 during normal use. This is also a safety feature, ensuring that butts or ash do not fall out of the tray if the ashtray is accidentally knocked over. Preferably the lid, tray and top member are of the same material, which may be metal and is preferably chrome-plated or coated with a zinc/aluminium alloy.

Whichever material is chosen for the lid, top member and tray, the important criteria are that the material is heat-safe, washable and hard wearing. An option for the material of the shoulder portion 24b is vitreous enamel, since this may be cleaned easily.

Preferably the ABS plastic body is susceptible of surface treatments for decoration.

The LEDs may be used to indicate on/off status of the fan, the need to replace the filter cartridge or the need to recharge the batteries 44 (if used). In the case of the last two mentioned operations a timer circuit (not shown) may be used to estimate the need for replacement of the filter cartridge or recharge of the batteries, based upon the number of hours of use. The batteries 44 may be recharged from the mains whilst the fan is operational. A timer circuit may also be provided to automatically de-activate the fan after a pre-determined period has passed. The various timer circuits, LEDs display and fan controls may be part of a programmed microprocessor.

The top member 20 is arranged such that the corrugated support portion 24a slopes downwardly and inwardly from the edge of the body 12, towards the aperture 22, as do the shoulder portion 24b and stubbing part 24c, for reasons of safety. The elliptical shape of the ashtray provides that the corrugations on the support portion 24a are of different lengths so that cigarettes or other smoker's articles of different lengths may be accommodated on the member 20 with their burning ends close to the aperture 22.

The ellipsoidal shape of the ashtray has a further advantage in that its "footprint" or the area of the supporting surface which is covered by the ashtray, is less intrusive—i.e. causes less of an obstruction —than a rectangular or circular shape of the same area. This permits the maximising of filter surface area whilst minimising the useful table space taken up by the ashtray. The need to maximise the area of filter surface presented to the smoke arises from the desire to increase longevity of the filter.

This need is also addressed by the use of a filter cartridge which extends substantially across the entire body of the ashtray, i.e. without the need for a central opening in the filter which has been the case in many prior fan-assisted ashtrays.

The size of the aperture is carefully chosen to ensure correct velocity of air flow, with entrained smoke, into the ashtray while permitting easy deposition of ash and butts in the tray, and subsequently concealing them from view.

The size of the gap between the bottom of the tray and the top of the filter cartridge is carefully selected to promote the even distribution of smoke over the filter surface, taking into account turbulence, so as to maintain filter efficiency and longevity. In addition the speed of the fan and thickness of the filter elements are carefully chosen to ensure efficient smoke entrainment and provide sufficient "dwell time" of the smoke in the filter, for efficient filtration, whilst the flow-path through the aperture, over the sides of the tray and into the gap beneath allows the hot smoke to cool somewhat before contact with the filer so as not to damage the filtration media.

The mounting arrangement of the lid on the hinge, and the hinge on the track conveniently permits a hinged opening on a non-rectangular body without the need for a bulky and unsightly external hinge mounting which is often the case with peripherally mounted hinges on circular or elliptical vessels. The lid arrangement also conveniently permits the switching on and switching off of the fan, and seals the ashtray, physically confining all signs of smoking to the interior of the ashtray.

A modified version (not shown) designed specifically for use with cigars, has a slightly different top member 20. The corrugations of the support surface 24a are replaced with a single trough or channel, deeper than the previous corrugations to allow for the greater diameter of cigars, and angled downwardly towards the aperture which is placed somewhat further toward the hinge-end of the body. This provides room so that cigars—considerably longer than cigarettes—do not fall off the ashtray. Also the stubbing surface 24c is removed so as not to present an obstacle to the burning embers of the cigar, which must remain intact and as large as possible during the smoking of the cigar.

A body 12 can be supplied with two top members 20 a cigar and cigarette top member. The body 12 and alternative top members may be provided with magnetic proximity (or magnet reed).

Switches which allow the ashtray control circuitry or microprocessor to recognise the type of top member in place and, if appropriate, adjust the timing circuits to reflect the different smoking profile and characteristics of cigars and cigarettes.

What is claimed is:

1. A fan-assisted ashtray comprising:
   a substantially hollow body having a closable lid mounted thereon;
   a support member extending across an upper end of the body, for supporting a smoker's article, and defining an aperture therein;
   a tray member located below the aperture for containing ash from a smoker's article;
   a filter member located below the tray member;
   an electrically powered fan located below the filter member for drawing air and smoke from the smoker's article through the aperture, around the tray and through the filter member, and for exhausting filtered air to the exterior of the body through a vent; and
   wherein the support member and tray member are releasably coupled together by a clip means, for simultaneous removal of both support member and tray member from the body.

2. An ashtray according to claim 1 wherein the ashtray is generally ellipsoidal in shape.

3. An ashtray according to claim 1 wherein the filter member extends across substantially an entire horizontal sectional area of the body.

4. An ashtray according to claim 1 wherein the lid is mounted on a hinge member, the hinge member being slidably mounted on a track at an upper edge region of the body for both pivotal and sliding movement of the lid, with respect to the body, between open and closed positions.

5. An ashtray according to claim 4 wherein the track is defined by an oblique surface at the upper edge region of the body.

6. An ashtray according to claim 5 wherein the support member comprises the oblique surface of the upper edge region of the body, on which is formed the track.

7. An ashtray according to claim 1 wherein activation and deactivation of the electric fan is arranged to be effected, respectively by opening and closing of the lid.

8. An ashtray according to claim 1 wherein the aperture defined by the support member is disposed eccentrically with respect to the support member.

9. An ashtray according to claim 1 wherein the support member has a sloping portion which slopes inwardly and downwardly away from an edge of the body.

10. An ashtray according to claim 1 wherein the aperture is substantially elliptical or ovoid in shape.

11. An ashtray according to claim 1 wherein the lid is arranged to close sealably the hollow body.

12. A fan-assisted ashtray comprising:
    a substantially hollow body having a closable lid mounted thereon;
    a support member extending across an upper end of the body, for supporting a smoker's article, and defining an aperture therein;
    a tray member located below the aperture for containing ash from a smoker's article;
    a filter member located below the tray member;
    an electrically powered fan located below the filter member for drawing air and smoke from the smoker's article through the aperture, around the tray and through the filter member, and for exhausting filtered air to the exterior of the body through a vent; and
    a hinge member being slidably mounted on a track at an upper edge region of the body for both pivotal and sliding movement of the lid, with respect to the body, between open and closed positions.

13. An ashtray according to claim 12 wherein the track is defined by an oblique surface at the upper edge region of the body.

14. An ashtray according to claim 12 wherein activation and deactivation of the electric fan is arranged to be effected, respectively, by opening and closing of the lid.

15. An ashtray according to claim 12 wherein the aperture defined by the support member is disposed eccentrically with respect to the support member.

16. An ashtray according to claim 12 wherein the support member has a sloping portion which slopes inwardly and downwardly away from the edge of the body.

17. An ashtray according to claim 12 wherein the aperture is substantially elliptical or ovoid in shape.

18. An ashtray according to claim 12 wherein the lid is arranged to sealably close the open body.

19. An ashtray according to claim 13 wherein the support member comprises the oblique surface of the upper edge region of the body, on which is formed the track.

20. A fan-assisted ashtray comprising:
    a substantially hollow body;
    a support member for supporting a smoker's article with an aperture therein;

a tray member located below the aperture for containing ash from the smoker's article;

an electrically powered fan located below the article for drawing air and smoke through the aperture and around the tray and for exhausting air to the exterior of the body through a vent; and a closable lid mounted on the body by a hinge member providing both pivotal and sliding movement of the lid with respect to the body, between open and closed positions.

21. An ashtray according to claim 20 wherein the hinge member is slidably mounted on a track on an upper edge region of the body.

22. An ashtray according to claim 21 wherein the track is defined by an oblique surface at the upper edge region of the body.

23. An ashtray according to claim 20 wherein activation and deactivation of the electric fan is arranged to be effected, respectively, by opening and closing of the lid.

* * * * *